(12) United States Patent
Chabanne et al.

(10) Patent No.: US 12,395,328 B2
(45) Date of Patent: Aug. 19, 2025

(54) IDENTITY CHECKING METHOD USING USER TERMINALS

(71) Applicant: Idemia Identity & Security France, Courbevoie (FR)

(72) Inventors: Hervé Chabanne, Courbevoie (FR); Vincent Despiegel, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 270 days.

(21) Appl. No.: 18/046,563

(22) Filed: Oct. 14, 2022

(65) Prior Publication Data

US 2023/0123760 A1 Apr. 20, 2023

(30) Foreign Application Priority Data

Oct. 19, 2021 (FR) ......................................... 2111110

(51) Int. Cl.
*H04L 9/08* (2006.01)
*H04L 9/00* (2022.01)

(52) U.S. Cl.
CPC .............. *H04L 9/088* (2013.01); *H04L 9/008* (2013.01)

(58) Field of Classification Search
CPC ................................ H04L 9/088; H04L 9/008
See application file for complete search history.

(56) References Cited

U.S. PATENT DOCUMENTS

| | | | | |
|---|---|---|---|---|
| 11,838,762 | B1* | 12/2023 | Shahidzadeh | ........ H04W 12/06 |
| 2002/0193973 | A1* | 12/2002 | Kinoshita | .............. G07B 15/00 |
| | | | | 703/1 |
| 2006/0055512 | A1* | 3/2006 | Chew | ........................ G07C 9/37 |
| | | | | 705/13 |
| 2007/0226512 | A1* | 9/2007 | Kevenaar | ................ G06F 21/32 |
| | | | | 713/186 |
| 2009/0177939 | A1* | 7/2009 | Chabanne | ............... G06F 21/32 |
| | | | | 714/752 |
| 2013/0174273 | A1* | 7/2013 | Grab | ....................... G06F 21/10 |
| | | | | 726/28 |
| 2015/0025921 | A1* | 1/2015 | Smith | ................. G07F 17/0014 |
| | | | | 705/5 |

(Continued)

OTHER PUBLICATIONS

Toward more secure and reliable access control. (Year: 2012).*

(Continued)

*Primary Examiner* — Yonas A Bayou
(74) *Attorney, Agent, or Firm* — WOMBLE BOND DICKINSON (US) LLP

(57) ABSTRACT

A method for checking the identity of a reference individual, the method comprising the following steps, implemented by a checking device: selecting terminals respectively associated with individuals forming part of a set of individuals whose identities are intended to be checked by the checking device, the individual forming part of the set of individuals; sending, to each of the selected terminals, an input datum associated with the reference individual and a request asking the terminal to implement a first cryptographic processing operation producing an output datum from the input datum and from a private key specific to the individual associated with the terminal; receiving each output datum; and implementing a second cryptographic processing operation producing a check result relating to the reference individual from each output datum.

13 Claims, 3 Drawing Sheets

(56) References Cited

U.S. PATENT DOCUMENTS

2018/0211187 A1* 7/2018 Chen .................. H04W 4/08
2020/0013247 A1* 1/2020 Alonso Tabares ....... G07C 9/28

OTHER PUBLICATIONS

Asharov et al., "Multiparty Computation with Low Communication, Computation and Interaction via Threshold FHE", International Association for Cryptologic Research, vol. 20120611:173056, Jun. 2012, pp. 1-48.
Bentov, I., et al., "Bitcoin beacon", arXiv preprint arXiv:1605.04559, 2016, 26 pages.
Boneh, D., et al., "Verifiable Delay Functions", CRYPTO, 2018, pp. 757-788.
Bonneau, J., et al., "On bitcoin as a public randomness source", https://eprint.iacr.org/2015/1015.pdfa, 2015, 32 pages.
Peeters et al., "Toward More Secure and Reliable Access Control", IEEE Pervasive Computing, vol. 11, No. 3, Mar. 2012, pp. 76-83.
Preliminary Research Report received for French Application No. 2111110, mailed on Jun. 10, 2022, 4 pages (1 page of French Translation Cover Sheet and 3 pages of original document).

* cited by examiner

[Fig. 1]
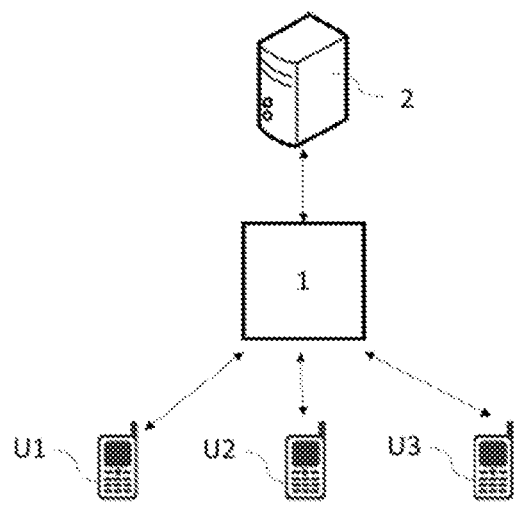
[Fig. 2]
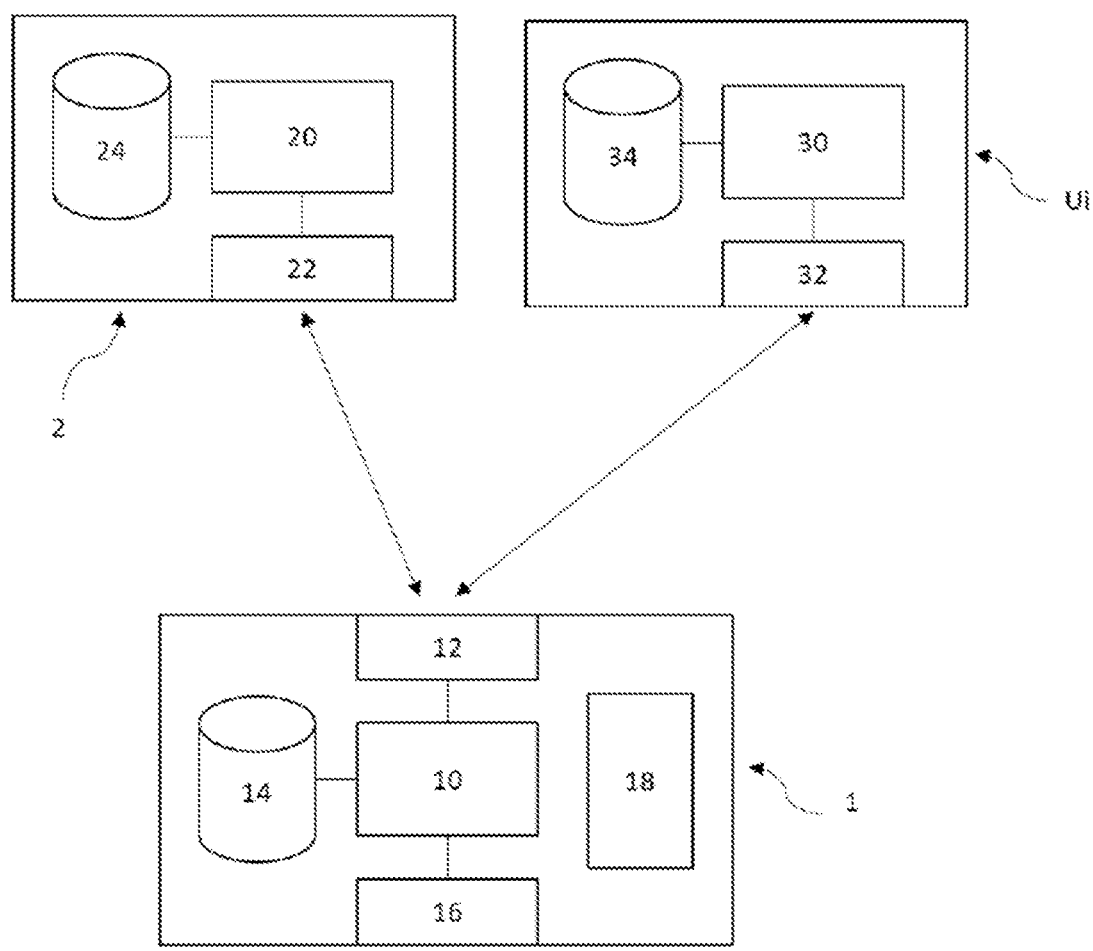

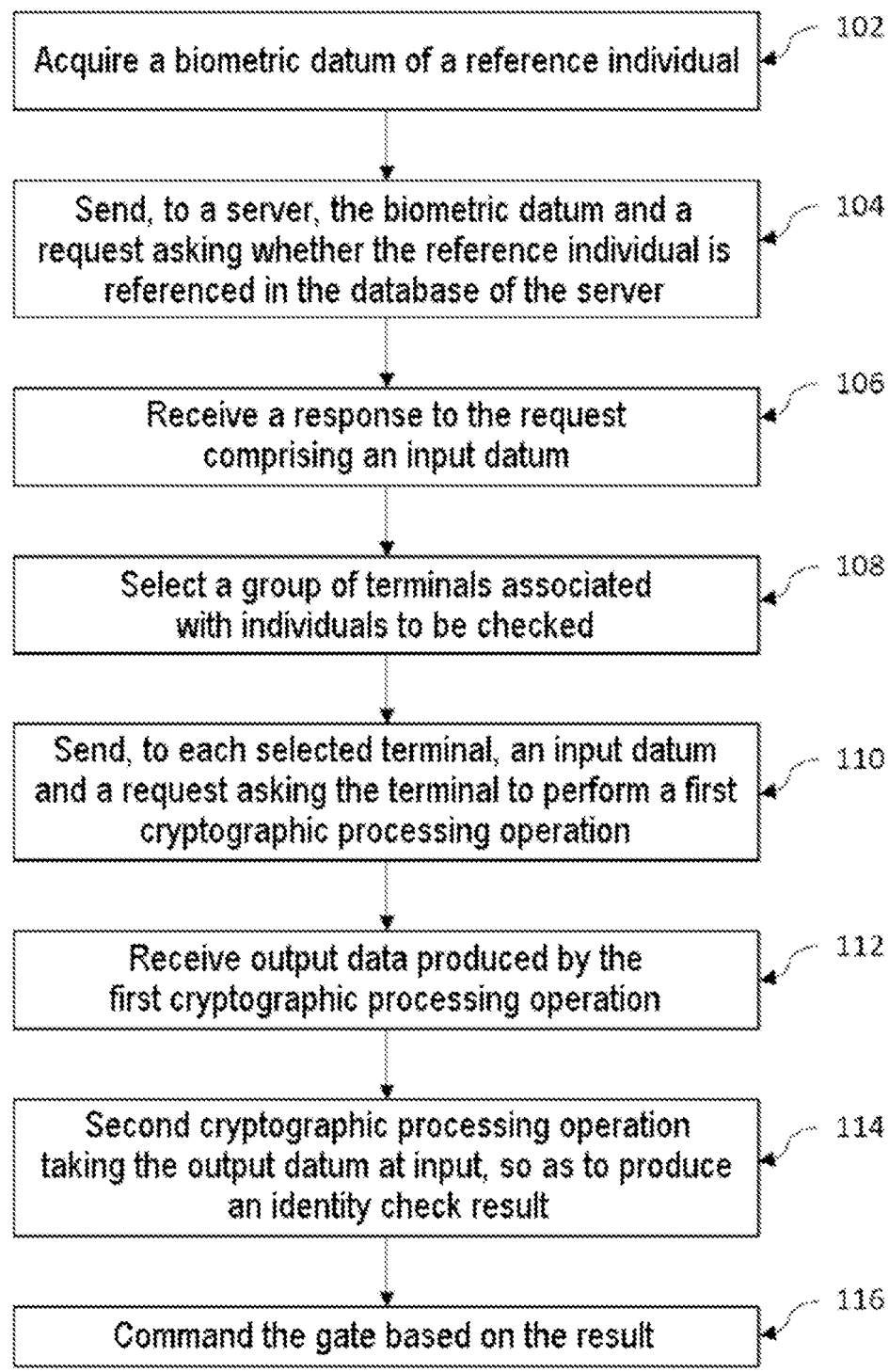

[Fig. 4]
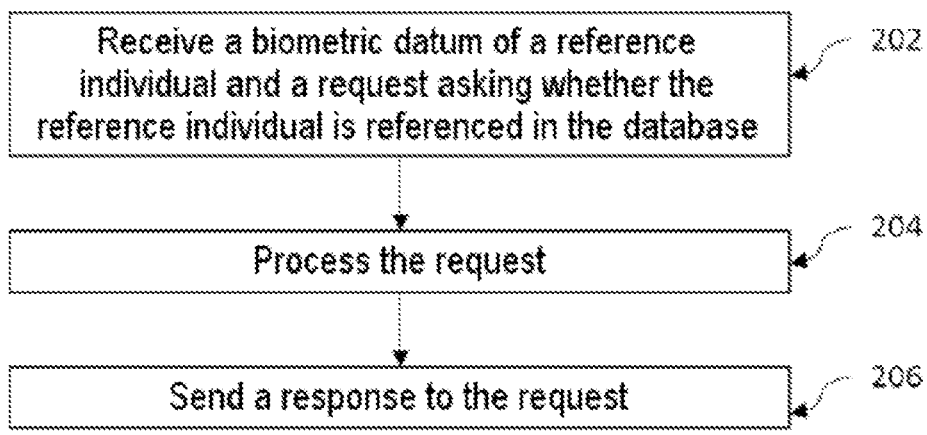
[Fig. 5]
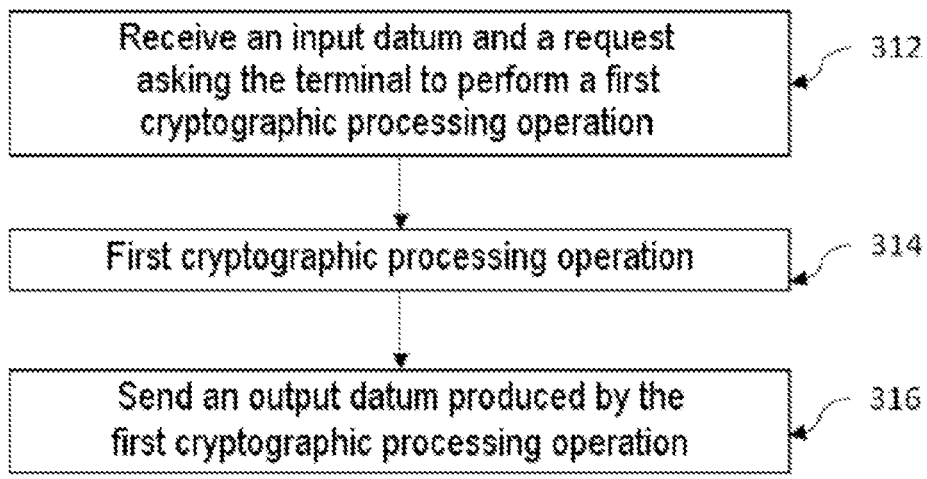

IDENTITY CHECKING METHOD USING USER TERMINALS

CROSS-REFERENCE TO RELATED APPLICATIONS

This application claims priority pursuant to 35 U.S.C. 119(a) to French Application No. 2111110, filed Oct. 19, 2021, which application is incorporated herein by reference in its entirety.

FIELD OF THE INVENTION

The present invention relates to an identity checking method.

PRIOR ART

To safeguard the boarding of passengers onto an aircraft, one solution that is contemplated is that of constructing a biometric database containing biometric data of the passengers prior to boarding. Such a database is for example created from biometric data. The identity of the passengers may be checked prior to boarding by interrogating such a database.

The construction of such databases is subject to regulations in certain countries. In particular, such biometric databases cannot be constructed without prior authorization from an authority (for example, the CNIL [Commission Nationale Informatique & Liberté, the French Data Protection Agency]). In general, the authority makes this authorization conditional on security guarantees.

To protect the confidentiality of the data stored in such a database, one solution that is contemplated is that of encrypting them.

It could be contemplated to encrypt the data with a single key. However, this solution is risky, since if an attacker manages to ascertain the key in question and accesses the database, they could decrypt the entire content thereof.

Another solution would be to entrust each individual with a private key, which would be stored on a terminal belonging to the individual. However, this solution is constrictive since it cannot be applied generally to individuals who do not have a terminal suited to this purpose, or do not want their terminal to be used for this purpose.

SUMMARY OF THE INVENTION

One aim of the invention is to propose an identity check that is simple and secure and that is auditable. An "auditable" identity check is understood to mean an identity check the security level of which may be verified a posteriori by an independent authority.

To this end, what is proposed, according to a first aspect, is a method for checking the identity of a reference individual, the method comprising the following steps, implemented by a checking device: selecting terminals respectively associated with individuals forming part of a set of individuals whose identities are intended to be checked by the checking device; the individual forming part of the set of individuals; sending, to each of the selected terminals, an input datum associated with the reference individual and a request asking the terminal to implement a first cryptographic processing operation producing an output datum from the input datum and from a private key specific to the individual associated with the terminal; receiving each output datum; implementing a second cryptographic processing operation producing a check result relating to the reference individual from each output datum.

In the proposed method, some of the cryptographic processing operations leading to the identity check result are entrusted to the terminals of the individuals to be checked that have been selected. Such a distribution bolsters the security of the identity checking method, since, to be broken, it would require all of the devices present to be attacked (checking device 1 and terminals engaged).

This method is also auditable. For this purpose, an auditor (for example a representative of the French CNIL) may check that a terminal in their possession is enrolled with the checking device, so as to allow this terminal to contribute to performing the first cryptographic processing operation.

The method according to the first aspect may also comprise the following optional features, which may be taken on their own or in combination wherever possible.

Preferably, at least three terminals are selected in the selection step.

Preferably, the output datum produced by a terminal also depends on a random generated by the terminal.

Preferably: the input datum is a first portion $c_1$ of a cipher resulting from an encryption applied to identity data of the reference individual; the second cryptographic processing operation produces the check result relating to the reference individual from each output datum and from a second portion $c_0$ of the cipher; the implementations of the first cryptographic processing operation by the terminals and the implementation of the second cryptographic processing operation by the checking terminal together form a decryption of the cipher using a key that depends on the private keys specific to the individuals associated with the selected terminals.

Preferably, the cipher results from a homomorphic encryption.

Preferably, the decryption is a decryption using the Brakerski/Fan-Vercauteren scheme.

Preferably, the output datum $w_i$ produced by a selected terminal of index i is computed as follows:

$$w_i = s_i \cdot c_1 + e_i + 2^k \cdot d \cdot r_i \bmod q$$

where:

$s_i$ denotes the private key specific to an individual associated with the terminal of index i,
$c_1$ denotes the input datum,
$e_i$ and $r_i$ are randoms generated by the terminal of index i,
q is a predefined number,
d is the lower integer part of q/t, t being a predefined integer strictly less than q,
k is a number of bits of the check result relating to the reference individual.

Preferably, the second cryptographic processing operation comprises computing the following value:

$$c_0 + \Sigma_i w_i$$

where $c_0$ denotes a datum that forms, with the input datum, a cipher resulting from an encryption applied to identity data of the reference individual, and where $w_i$ denotes the output datum produced by the terminal associated with the individual of index i, and extracting k least significant bits from a number modulo t, the number being the integer closest to the product of the computed value and t/q, t being a predefined integer strictly less than q.

Preferably, the terminals are selected based on an identity element of the individuals associated with the terminals.

Preferably, the terminals are selected based on a verifiable random element.

Preferably, the method according to the first aspect also comprises a step of acquiring a biometric datum of the reference individual, wherein the input datum is at least one portion of a cipher of a datum indicating whether the reference individual is referenced in a biometric database.

What is also proposed, according to a second aspect, is a method for controlling access to a secure area, the method comprising implementing, for each individual forming part of a set of candidate individuals for accessing the secure area, a check on the identity of the individual using the method according to the first aspect.

What is also proposed, according to a third aspect, is a computer-readable memory storing instructions able to be executed by a data processing unit in order to execute the steps of the method according to the first aspect or according to the second aspect.

DESCRIPTION OF THE FIGURES

Further features, objects and advantages of the invention will become apparent from the following description, which is purely illustrative and non-limiting and should be read in conjunction with the appended drawings, in which:

FIGS. 1 and 2 schematically illustrate various devices forming part of a system according to one embodiment, able to be used to check the identity of individuals.

FIGS. 3, 4 and 5 are flowcharts of steps of an identity checking method according to one embodiment.

In all of the figures, elements that are similar bear the same reference signs.

DETAILED DESCRIPTION OF THE INVENTION

With reference to FIGS. 1 and 2, a system comprises a checking device 1, a server 2 and a plurality of terminals. In FIG. 1, only three terminals U1, U2, U3 are illustrated by way of non-limiting example.

The checking device 1 is tasked with checking the identity of individuals.

The checking device 1 comprises a data processing unit 10, a communication interface 12 for communicating with the terminals 3 and with the server 2, and a memory 14.

The data processing unit 10 is configured to implement certain steps of an identity checking method that will be described below. For example, the data processing unit 10 comprises at least one processor configured to execute the code instructions of a program so as to implement these steps.

The communication interface 12 is for example of wireless radio type, and uses any communication protocol (Wi-Fi, Bluetooth, etc.).

The memory 14 is able to store data that are manipulated or produced by the processing unit 12. It is of any type.

The checking device 1 moreover comprises biometric data acquisition means 16. The acquisition means 16 may comprise a camera configured to acquire images showing the face of an individual, and to extract biometric data from such images. As an alternative, the acquisition means 16 may comprise a fingerprint sensor and/or an iris sensor.

In one embodiment, the checking device 1 furthermore comprises a gate 18 that may be closed in order to prevent an individual from accessing a secure area, and be opened in order to allow such access. The data processing unit 10 is in particular configured to command the opening and the closure of the gate 18.

For example, the checking device 1 is located in an airport, and the secure area is a boarding area; in this specific application, the individuals wishing to access the boarding area are passengers for a flight, whose identity is to be checked before boarding.

The server 2 also comprises a data processing unit 20, a communication interface 22 for communicating with the checking device 1, and a memory 24.

The information provided above with regard to the data processing unit 10 and the communication interface 12 may also be applied to the processing unit 20 and to the communication interface 22.

The memory 24 stores a biometric database containing confidentiality-protected biometric data. Biometric data relating to previously enrolled individuals are referenced in the database. The biometric data of an enrolled individual are not in open form in the database, but are by contrast confidentiality-protected, that is to say have an encrypted form, by virtue of an encryption method known from the prior art.

The data processing unit 20 is configured to process requests coming from the checking device 1, these requests aiming to ascertain whether or not a biometric datum is referenced in the database. The processing unit 20 is configured to respond to a request of this type with a response that is itself confidentiality-protected. In other words, the response is a cipher that it is still necessary to decrypt in order to ascertain whether the biometric datum provided with the initial request was actually referenced in the biometric database.

A terminal Ui also comprises a data processing unit 30, a communication interface 32 for communicating with the checking device 1, and a memory 34.

The information provided above with regard to the data processing unit 10 and the communication interface 12 may also be applied to the processing unit 30 and to the communication interface 32. The communications between the interfaces 12, 22 and the communications between the interfaces 12, 32 may use identical or else different protocols.

A private key specific to an individual in possession of the terminal is stored in the memory 34.

Each terminal Ui is in accordance with the above description. The private keys stored in the respective memories of the terminals Ui are different.

The terminals U1, U2, U3 are typically portable terminals such as smartphones.

With reference to FIGS. 3, 4 and 5, a method for checking identity by way of the system as described above comprises the following steps. The steps implemented by the checking device are shown in FIG. 3, the steps implemented by the server are shown in FIG. 4, and the steps implemented by a terminal Ui are shown in FIG. 5. When it is mentioned hereinafter that the checking device 1, the server 2 or a terminal Ui implements a processing operation, it will be understood that this processing operation is implemented more specifically by the corresponding data processing unit 10, 20 or 30.

As a preliminary point, it is assumed that a set of individuals present themselves close to the checking device 1. The identity of each individual of this set is to be checked. For example, the individuals to be checked are passengers for a flight who present themselves at a boarding gate of an airport where the checking device 1 has been installed.

Some individuals of this set possess terminals Ui that belong to them. Hereinafter, it will be assumed that at least three individuals are equipped with a terminal in accordance with the above description. In other words, at least three terminals in accordance with the above description are located close to the checking device 1, as shown in FIG. 1.

An individual from the set, who will be called reference individual by convention, presents themself before the checking device 1.

In a step 102, the checking device 1 acquires a biometric datum of the reference individual. This step may be performed using biometric acquisition means of the checking device 1. As a variant, if the reference individual possesses a terminal Ui (this not being mandatory), this terminal Ui may acquire the biometric datum and then transmit it to the checking device 1 via the communication interface 32.

In a step 104, the device sends, to the server 2, the biometric datum of the reference individual and a request asking whether the biometric datum is referenced in the database, in other words a biometric datum of the reference individual is present in the database.

In a step 202, the server receives the biometric datum of the reference individual along with the request.

In a step 204, the server 2 applies a processing operation known from the prior art for this purpose. This processing operation produces a response in the form of a cipher. Hereinafter, consideration will be given to an embodiment in which this cipher is in the form of a pair of data $c_0$, $c_1$. These two data constitute two different portions of the cipher.

Preferably, the processing operations performed by the server 2 are performed in an encrypted domain (the input data for these data processing operations are not in open form). In one embodiment, the biometric datum of the reference individual is encrypted before being processed by the server 2. This encryption may be performed by the checking device 1 or else in a preliminary step by the server 2.

In a step 206, the response that is produced is transmitted by the server 2 to the checking device 1. The response indicates whether or not the acquired biometric datum, relating to the reference individual, is referenced in the database, but this indication is not in open form. The checking device 1 receives the response in a step 106. At this stage, the device is therefore not able to ascertain this indication. It will be seen that, to obtain this indication, terminals are engaged.

It is assumed at this stage that the checking device 1 is capable of ascertaining that mobile terminals are associated with individuals forming part of the set of individuals, by implementing a preliminary enrolment procedure and/or a dialogue between the mobile terminals and the checking device 1.

In a selection step 108, the checking device 1 selects a group of N terminals respectively associated with individuals forming part of the set of individuals to be checked. N may be a predefined number, preferably greater than or equal to 3.

This selection step 108 is based for example on an identity element of the individuals, for example their surname, their first name, etc. For example, the checking device 1 obtains the surname of each individual of the set, and sorts them by alphabetical order. A group consists of N individuals whose names are adjacent in the alphabetical list thus obtained. As a variant, the checking device 1 obtains a cipher of an identity element of each individual of the set, for example a cipher of a surname. The ciphers are numbers that are also able to be sorted by order of value, and a group of N individuals may thus be formed by taking N ciphers of values that are adjacent once sorted.

Preferably, the selection is not made only on the basis of an identity element, but also on the basis of a verifiable random element, also called a randomness beacon in the literature. This external element gives the selection entropy, but allows a posteriori verification of a selection made in step 108. Some examples of randomness beacons able to be used as a basis for the selection 108 are described in the following documents: J. Clark and U. Hengartner. On the Use of Financial Data as a Random Beacon. Usenix EVT/WOTE, 2010; I. Bentov, A. Gabizon, and D. Zuckerman. Bitcoin beacon. arXiv preprint arXiv:1605.04559, 2016/J. Bonneau, J. Clark, and S. Goldfeder. On bitcoin as a public randomness source. https://eprint.iacr.org/2015/1015.pdfa, 2015; Dan Boneh, Joseph Bonneau, Benedikt Bünz, Ben Fisch: Verifiable Delay Functions. CRYPTO (1) 2018: 757-788.

It should be noted that the selection step 108 may be performed before, during or after steps 102, 104, 106, 202, 204, 206.

At the end of the selection step 108, a group of N terminals U1, ..., Un has been formed.

Steps implemented for each selected terminal Ui are described below.

In a step 110, the checking device 1 sends, to the terminal Ui, the datum $c_1$, forming a portion of the cipher that is returned by the server 2. By contrast, the other portion $c_0$ of this cipher is not sent to the terminal Ui. The checking device 1 also sends, to the terminal Ui, a request asking the terminal Ui to implement a first cryptographic processing operation producing an output datum $w_i$ from the datum $c_1$ and from the private key $s_i$ stored by the terminal Ui.

Upon receipt of this request (step 312), the terminal Ui implements the abovementioned first cryptographic processing operation (step 314) from the input datum.

In a step 316, the terminal Ui transmits the output datum $w_i$ to the checking device 1 in response to the request. The checking device receives the output datum $w_i$ sent by the terminal Ui in a step 112.

Above steps 110, 312, 314, 316 are repeated for each of the N terminals U1, ..., UN. As a result, the checking device 1 obtains N output data $w_1$, ..., $w_N$ (step 112).

In a step 114, the checking device 1 implements a second cryptographic processing operation taking the N output data $w_1$, ..., $w_N$ at input, and producing, based thereon, a check result relating to the reference individual.

The second cryptographic processing operation 114 also takes the cipher portion $c_0$ at input.

The N implementations of the first cryptographic processing operation that are distributed between the N terminals and the subsequent implementation of the second cryptographic processing operation together form a decryption of the cipher ($c_0$, $c_1$) using a key s that depends on the N private keys $s_1$, ... $s_N$. It is observed here that some steps of this decryption have been delegated to terminals associated with individuals whose identity is to be checked. The decryption is thus not entrusted entirely to the checking device 1 alone.

The result of the identity check indicates whether or not the biometric datum of the reference individual that was acquired in step 102 is referenced in the database, in other words whether the reference individual has been enrolled. In the specific context of accessing a secure area, the reference individual has been enrolled when they have been given an access pass to this area (in the form for example of a physical or dematerialized ticket).

In a step 116, the processing unit 10 of the checking device 1 commands opening of the gate 18, or keeping of said gate in the open position, if the check result indicates that the biometric datum of the individual that has been acquired is referenced in the database. Otherwise, the gate is closed or remains closed.

In one embodiment, the decryption that is performed is a homomorphic decryption, for example a decryption using the Brakerski/Fan-Vercauteren (BFV) scheme. Furthermore, the decryption key s is the sum of the N private keys of the group:

$$s = \Sigma_i s_i$$

In a first variant of this homomorphic embodiment, the first cryptographic processing operation may compute the output datum $w_i$ as follows:

$$w_i = s_i \cdot c_1 + e_i$$

where $e_i$ is a random generated by the terminal Ui.

In a second variant of this homomorphic embodiment, which has the advantage of being more secure than the first variant, the first cryptographic processing operation computes the output datum $w_i$ as follows:

$$w_i = s_i \cdot c_1 + e_i + 2^k \cdot d \cdot r_i \bmod q$$

where:

k and q are predefined integers, d is the lower integer part of q/t (t being a predefined integer strictly less than q), $r_i$ is another random generated by the terminal Ui.

the randoms $r_i$ and $e_i$ make it possible to conceal a portion of the results (a portion not useful for the checking device 1).

For example, the second cryptographic processing operation comprises the following addition:

$$c_0 + \Sigma_i w_i$$

In the second variant embodiment, the checking device 1 is able to deduce, from this computation, the value $d(m+2^k r) + e \bmod q$, where $r = \Sigma_i r_i$.

In this expression, m is a message comprising:

k least significant bits forming the result of the identity check, that is to say the result of a decryption of the cipher $(c_0, c_1)$ using the decryption key s.

other most significant bits, forming a non-useful portion, which is rendered unusable due to the presence of the randoms r.

The identity check result may be extracted from the value $d(m+2^k r) + e \bmod q$ by selecting the k least significant bits of a number modulo t, the number being the integer closest to the product of said value and t/q (the k least significant bits of the second term proportional to $2_k$ all being equal to zero by design).

The check result m may be a Boolean (k=1). As an alternative, the check result may be coded on more bits (k>1), thereby allowing in particular the identity check result to provide more information than a simple Boolean.

The identity checking method described above is repeated for each individual of the set of individuals to be checked, considering them in turn as the reference individual. Upon each implementation, the terminals Ui that are engaged may be identical or different, depending on the selection policy chosen in step 108.

One particular application of the identity checking method, in which the result of the check is a condition for accessing a secure area, has been discussed above. However, it will be understood that the identity checking method may have other applications.

The system presented in FIGS. 1 and 2 is also merely one non-limiting embodiment.

In particular, in this embodiment, the biometric database is stored outside the checking device. In other embodiments, the biometric database could be stored in the memory 14 of the checking device 1.

Moreover, in this embodiment, the checking device performing the second processing operation is separate from each of the terminals performing the first processing operation. In another embodiment, it could be contemplated for one of the terminals to assume the role of checking device, in other words for one of the terminals able to implement the first processing operation also to perform the second processing operation.

What is claimed is:

1. A method for checking the identity of a reference individual, the method comprising the following steps, implemented by a checking device:

selecting terminals respectively associated with individuals forming part of a set of individuals whose identities are intended to be checked by the checking device, the reference individual forming part of the set of individuals, sending by the checking device, to each of the selected terminals, an input datum associated with the reference individual and a request asking each said terminal to implement a first cryptographic calculation producing an output datum from the input datum associated with the reference individual and from a private key specific to the individual associated with the terminal, receiving by the checking device a plurality of output data comprising each output datum produced by the first cryptographic calculation, implementing a second cryptographic calculation producing a check result relating to the reference individual from the plurality of output data.

2. The method according to claim 1, wherein at least three terminals are selected.

3. The method according to claim 1, wherein the output datum produced by a terminal also depends on a random generated by the terminal.

4. The method according to claim 1, wherein:

the input datum is a first portion c1 of a cipher resulting from a calculation applied to identity data of the reference individual, the second cryptographic calculation produces the check result relating to the reference individual from each output datum and from a second portion $c_0$ of the cipher, the implementations of the first cryptographic calculation by the terminals and the implementation of the second cryptographic calculation by the checking terminal together form a decryption of the cipher using a key that depends on the private keys specific to the individuals associated with the selected terminals.

5. The method according to claim 1, wherein the cipher results from a homomorphic encryption.

6. The method according to claim 1, wherein the decryption is a decryption using the Brakerski/Fan-Vercauteren (BFV) scheme.

7. The method according to claim 1, wherein the output datum $w_i$ produced by a selected terminal of index i is computed as follows:

$$w_i = s_i \cdot c_1 + e_i + 2^k \cdot d \cdot r_i \bmod q$$

where:

$s_i$ denotes the private key specific to an individual associated with the terminal of index i, $c_1$ denotes the input datum, $e_i$ and $r_i$ are randoms generated by the terminal of index i, q is a predefined number, d is the lower integer part of q/t, t being an integer strictly less than q, k is a number of bits of the check result relating to the reference individual.

8. The method according to claim 1, wherein the second cryptographic calculation comprises:

computing the following value:

$$c_o + \Sigma_i w_i$$

where $c_0$ denotes a datum that forms, with the input datum, a cipher resulting from an encryption applied to identity data of the reference individual, and where wi denotes the output datum produced by the terminal associated with the individual of index i, and extracting k least significant bits from a number modulo t, the number being the integer closest to the product of the computed value and t/q, q being a predefined number and t being a predefined integer strictly less than q.

9. The method according to claim 1, wherein the terminals are selected based on an identity element of the individuals associated with the terminals.

10. The method according to claim 1, wherein the terminals are selected based on a verifiable random element.

11. The method according to claim 1, further comprising a step of acquiring a biometric datum of the reference individual, wherein the input datum is at least one portion of a cipher of a datum indicating whether the reference individual is referenced in a biometric database.

12. A method for controlling access to a secure area, the method comprising implementing, for each individual forming part of a set of candidate individuals for accessing the secure area, a check on the identity of the individual using the method according to claim 1.

13. A computer-readable memory storing instructions able to be executed by a data processing unit in order to execute the steps of the method according to claim 1.

\* \* \* \* \*